US010755317B2

(12) United States Patent
Balasubramanian et al.

(10) Patent No.: US 10,755,317 B2
(45) Date of Patent: *Aug. 25, 2020

(54) MANAGING A SET OF OFFERS USING A DIALOGUE

(71) Applicant: International Business Machines Corporation, Armonk, NY (US)

(72) Inventors: Swaminathan Balasubramanian, Troy, MI (US); Avijit Chatterjee, White Plains, NY (US); Rajiv V. Joshi, Yorktown Heights, NY (US); John J. Thomas, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 725 days.

This patent is subject to a terminal disclaimer.

(21) Appl. No.: 15/456,502

(22) Filed: Mar. 11, 2017

(65) Prior Publication Data

US 2018/0260854 A1    Sep. 13, 2018

(51) Int. Cl.
*G06Q 30/00* (2012.01)
*G06Q 30/02* (2012.01)
*H04M 3/51* (2006.01)
*G06F 40/30* (2020.01)
*G06F 40/211* (2020.01)

(Continued)

(52) U.S. Cl.
CPC ....... *G06Q 30/0269* (2013.01); *G06F 40/211* (2020.01); *G06F 40/253* (2020.01); *G06F 40/284* (2020.01); *G06F 40/30* (2020.01); *H04M 3/5166* (2013.01); *H04M 2203/355* (2013.01); *H04M 2203/357* (2013.01)

(58) Field of Classification Search
CPC . G06Q 30/0269; G06F 17/277; G06F 17/271; G06F 17/2785; G06F 17/274; H04M 3/5166; H04M 2203/357; H04M 2203/355
USPC ............................... 705/14.49, 14.66, 14.67
See application file for complete search history.

(56) References Cited

U.S. PATENT DOCUMENTS

| | | | |
|---|---|---|---|
| 8,171,509 B1 * | 5/2012 | Girouard | G06Q 30/0241 705/14.4 |
| 8,447,607 B2 * | 5/2013 | Weider | G10L 15/22 704/250 |

(Continued)

FOREIGN PATENT DOCUMENTS

| | | | | |
|---|---|---|---|---|
| EP | 1418519 A1 * | 5/2004 | | G06Q 30/02 |
| EP | 1418519 A1 | 5/2004 | | |

OTHER PUBLICATIONS

Han, Bo. Improving the Utility of Social Media with Natural Language Processing. (Feb. 2014). https://minerva-access.unimelb.edu.au/bitstream/handle/11343/41029/thesis.pdf (Year: 2014).*

(Continued)

*Primary Examiner* — Luis A Brown
(74) *Attorney, Agent, or Firm* — L. Jeffrey Kelly

(57) ABSTRACT

Disclosed aspects relate to managing a set of offers using a dialogue. An adaptive profile may be received with respect to a client. The adaptive profile may indicate a set of client profile data, a set of client event data, and a set of client context data. A dialogue may be established with the client based on the adaptive profile. A set of offers may be resolved by an offer management engine based on the dialogue. The set of offers may be presented to the client.

17 Claims, 8 Drawing Sheets

(51) Int. Cl.
*G06F 40/253* (2020.01)
*G06F 40/284* (2020.01)

(56) References Cited

U.S. PATENT DOCUMENTS

| | | | | |
|---|---|---|---|---|
| 8,452,598 | B2 | 5/2013 | Kennewick et al. | |
| 9,922,649 | B1* | 3/2018 | LoRe | G10L 15/22 |
| 2004/0098265 | A1* | 5/2004 | Kelly | G06Q 30/02 704/270 |
| 2010/0106498 | A1* | 4/2010 | Morrison | G10L 15/265 704/235 |
| 2010/0312650 | A1* | 12/2010 | Pinckney | G06Q 30/0269 705/14.66 |
| 2012/0109753 | A1* | 5/2012 | Kennewick | G06Q 30/0261 705/14.58 |
| 2014/0012577 | A1* | 1/2014 | Freeman | G06Q 30/0269 704/249 |
| 2015/0178371 | A1* | 6/2015 | Seth | G06Q 30/02 707/748 |
| 2015/0324860 | A1* | 11/2015 | Allen | G06F 40/30 705/14.66 |
| 2016/0071162 | A1* | 3/2016 | Ogawa | G06Q 30/0269 705/14.66 |
| 2016/0180403 | A1* | 6/2016 | Ganesh | G06Q 30/0269 705/14.66 |
| 2017/0169476 | A1* | 6/2017 | Nomula | G06N 3/006 |
| 2018/0012598 | A1* | 1/2018 | Thirukovalluru | G06F 16/313 |
| 2018/0174055 | A1* | 6/2018 | Tirumale | G06N 5/02 |

OTHER PUBLICATIONS

Han, "Improving the Utility of Social Media with Natural Language Processing", Feb. 2014, The University of Melbourne, Melbourne, Australia, 232 pages.
Singhai; "Anonymous Online Customers: Targeting strategy"; LinkedIn; Nov. 16, 2015. <https://www.linkedin.com/pulse/anonymous-online-customers-targeting-strategy-gaurav-singhai>.
Ferrie; "How to Use New Anonymous Targeting to Get Sales Faster"; HubSpot; Sep. 25, 2014. <https://blog.hubspot.com/marketing/new-anonymous-targeting#sm.001q1fkkr18uzdt1rht26wc2mheui>.
Tripp; "Managing the Anonymous to Authenticated Customer Experience"; Digital Marketing Blog; Sep. 9, 2015. <https://blogs.adobe.com/digitalmarketing/campaign-management/managing-the-anonymous-to-authenticated-customer-experience/>.
Wingate; "Using Predictive Analytics for Targeted Customer Strategy"; CEB Blogs; Jun. 25, 2013. <https://www.cebglobal.com/blogs/using-predictive-analytics-for-targeted-customer-strategy/>.
International Business Machines Corporation; "IBM Unveils Industry's First Platform to Integrate All Data Types for AI-Powered Decision-Making"; Sep. 27, 2016. <http://www-03.ibm.com/press/us/en/pressrelease/50650.wss>.
International Business Machines Corporation; "IBM Unveils Industry's First Platform to Integrate All Data Types for AI-Powered Decision-Making"; Sep. 27, 2016; 4 pages; Evidence of Grace Period Use or Sale; <http://www-03.ibm.com/press/us/en/pressrelease/50650.wss>.
Balasubramanian, et al., "Managing a Set of Offers Using a Dialogue", U.S. Appl. No. 15/851,888, filed Dec. 22, 2017.
List of IBM Patents or Patent Applications Treated as Related. Filed Dec. 22, 2017. 2 pages.

* cited by examiner

MANAGING A SET OF OFFERS USING A DIALOGUE

STATEMENT REGARDING PRIOR DISCLOSURES BY THE INVENTOR OR A JOINT INVENTOR

The following disclosure(s) are submitted under 35 U.S.C. 102(b)(1)(A): IBM Public Event, Sep. 27, 2016.

BACKGROUND

This disclosure relates generally to computer systems and, more particularly, relates to managing a set of offers using a dialogue. The amount of data that needs to be managed is increasing. Management of data may be desired to be performed as efficiently as possible. As data needing to be managed increases, the need for managing a set of offers using a dialogue may also increase.

SUMMARY

Aspects of the disclosure relate to managing a set of offers using a dialogue. Aspects relate to guiding a conversation with a client, and generating a set of offers for the client that are relevant to the dialogue. Initial seed data may be received at the start of the dialogue and used to initialize an adaptive profile associated with the dialogue. Suggested dialogue items may be generated based on the adaptive profile and provided to the client. The dialogue may be monitored to collect profile data, event data, and context data for the client, and the adaptive profile may be dynamically updated to revise the dialogue items provided to the client. Based on the adaptive profile, a set of offers relevant to the client may be generated and provided to the user.

Disclosed aspects relate to managing a set of offers using a dialogue. An adaptive profile may be received with respect to a client. The adaptive profile may indicate a set of client profile data, a set of client event data, and a set of client context data. A dialogue may be established with the client based on the adaptive profile. A set of offers may be resolved by an offer management engine based on the dialogue. The set of offers may be presented to the client.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
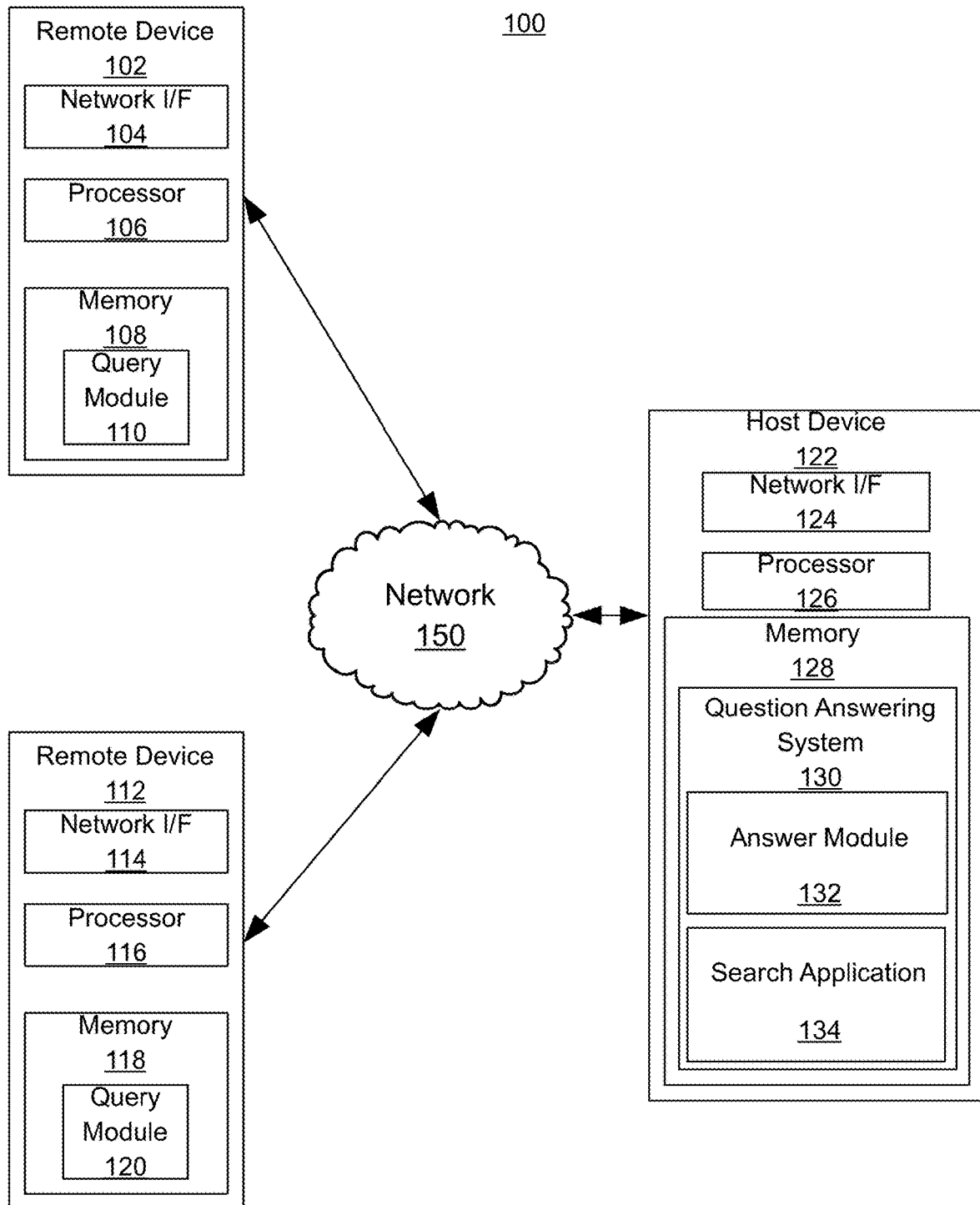
FIG. 1 is a diagrammatic illustration of an example computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing a set of offers using a dialogue. Aspects relate to guiding a conversation with a client, and generating a set of offers for the client that are relevant to the dialogue. Initial seed data may be received at the start of the dialogue and used to initialize an adaptive profile associated with the dialogue. Suggested dialogue items (e.g., questions, prompts, responses) may be generated based on the adaptive profile and provided to the client. The dialogue may be monitored to collect profile data, event data, and context data for the client, and the adaptive profile may be dynamically updated to revise the dialogue items provided to the client. Based on the adaptive profile, a set of offers relevant to the client may be generated and provided to the client. Leveraging an adaptive profile with respect to a dialogue may be associated with benefits such as customer support, dialogue relevance, and client experience.

Establishing an effective and meaningful dialogue with clients is one aspect of providing a quality customer experience. Aspects of the disclosure relate to the recognition that, in some situations, maintaining a customer experience of uniform quality that is tailored to the individual needs of a client may be associated with challenges, as different agents/representatives have different backgrounds, experience, and levels of expertise. Accordingly, aspects of the disclosure relate to monitoring a dialogue with a client to collect data (e.g., profile data, event data, context data) for the client, and generating an adaptive profile that can be used to provide dialogue suggestions (e.g., questions, comments, responses) to facilitate effective client communication. The adaptive profile may be used to provide a set of offers (e.g., proposals, transactions, recommendations) relevant to the client based on the dialogue. As such, the adaptive profile can be used to facilitate effective client communication and a quality customer experience based on the individual context of a particular client.

Aspects of the disclosure relate to a system, method, and computer program product for managing a set of offers using a dialogue. An adaptive profile may be received with respect to a client. The adaptive profile may indicate a set of client profile data, a set of client event data, and a set of client context data. A dialogue may be established with the client based on the adaptive profile. A set of offers may be resolved by an offer management engine based on the dialogue. The set of offers may be presented to the client.

Aspects of the disclosure relate to determining a set of dialogue items to provide to the client to facilitate the dialogue based on the adaptive profile, capturing a set of dialogue data from the client with respect to the dialogue, analyzing the set of dialogue data by the offer management engine, and identifying the set of offers using the set of dialogue data. In embodiments, the set of dialogue items may be provided to the client to facilitate the dialogue, and the set of dialogue data may be ascertained based on the set of dialogue items. In embodiments, the dialogue may be monitored to capture the set of dialogue data, and the adaptive profile may be updated in a dynamic fashion based on the set of dialogue data. In embodiments, it may be detected that the set of client event data includes a set of current activity information, the set of dialogue items to provide to the client to facilitate the dialogue may be determined based on the set of current activity information, the set of dialogue items which relate to the set of current activity information may be provided to the client to facilitate the dialogue, and a set of feedback data which indicates a set of relevant feedback to the set of dialogue items may be ascertained. Altogether, aspects of the disclosure can have performance or efficiency benefits. Aspects may save resources such as bandwidth, disk, processing, or memory.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 enable users to submit questions (e.g., search requests or other queries) to host devices 122 to retrieve search results. For example, the remote devices 102, 112 may include a query module 120 (e.g., in the form of a web browser or any other suitable software module) and present a graphical user (e.g., GUI, etc.) or other interface (e.g., command line prompts, menu screens, etc.) to solicit queries from users for submission to one or more host devices 122 and further to display answers/results obtained from the host devices 122 in relation to such queries.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., receiving an input question, evaluating the quality of the input question, assigning a set of quality values, and generating an icon), and may be implemented by any combination of any quantity of software and/or hardware modules or units.

Figure 2:
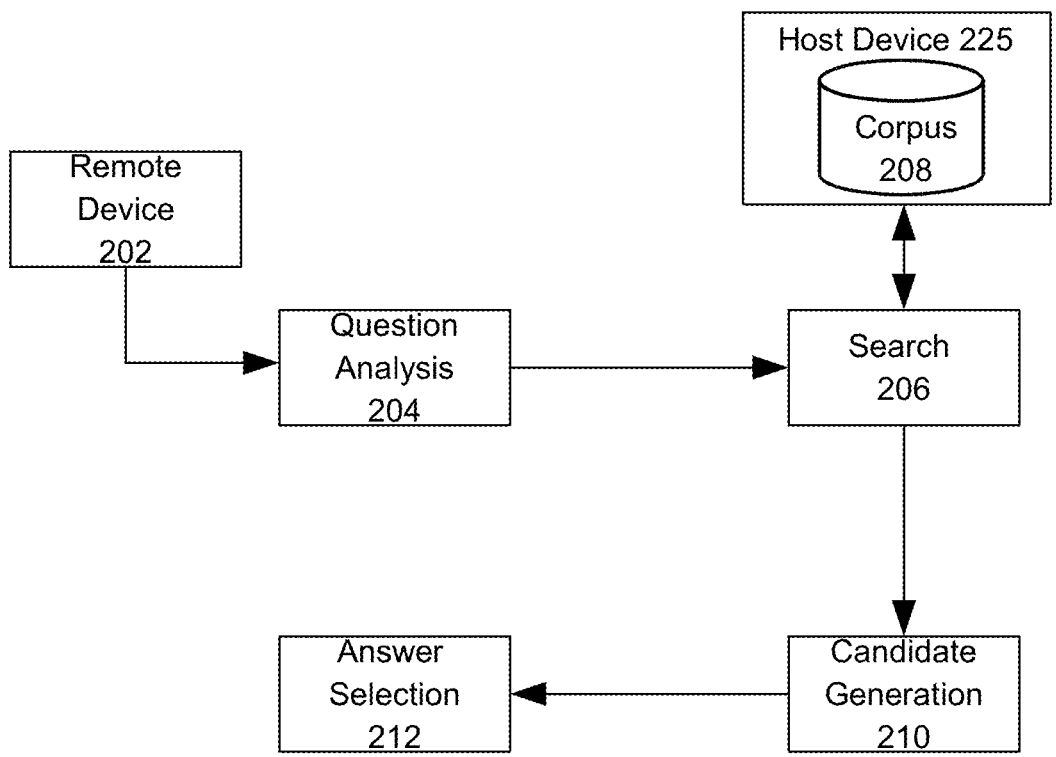
FIG. 2 is a system diagram depicting a high level logical architecture for a question answering system, according to embodiments.

FIG. 2 is a system diagram depicting a high-level logical architecture 200 for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The search component 206 can formulate queries from the output of the question analysis component 204 and may consult various resources such as the internet or one or more knowledge resources, e.g., databases, corpora 208, to retrieve documents, passages, web-pages, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212 which may produce a final ranked list of answers with associated confidence measure values.

The various components of the exemplary high level logical architecture for a QA system described above may be used to implement various aspects of the present disclosure. For example, the question analysis component 204 could, in certain embodiments, be used to process a natural language question for which relevant images can be provided. Further, the search component 206 can, in certain embodiments, be used to perform a search of a corpus of information 208 for a set of images that are related to an answer to an input question to the QA system. The candidate generation component 210 can be used to identify a set of candidate images based on the results of the search component 206. Further, the answer selection component 212 can, in certain embodiments, be used to determine and select a subset of the set of candidate images to provide in a display area. In certain embodiments, the determination of the subset of the candidate images can be based on a confidence value of the set of images and a designated display specification.

Figure 3:
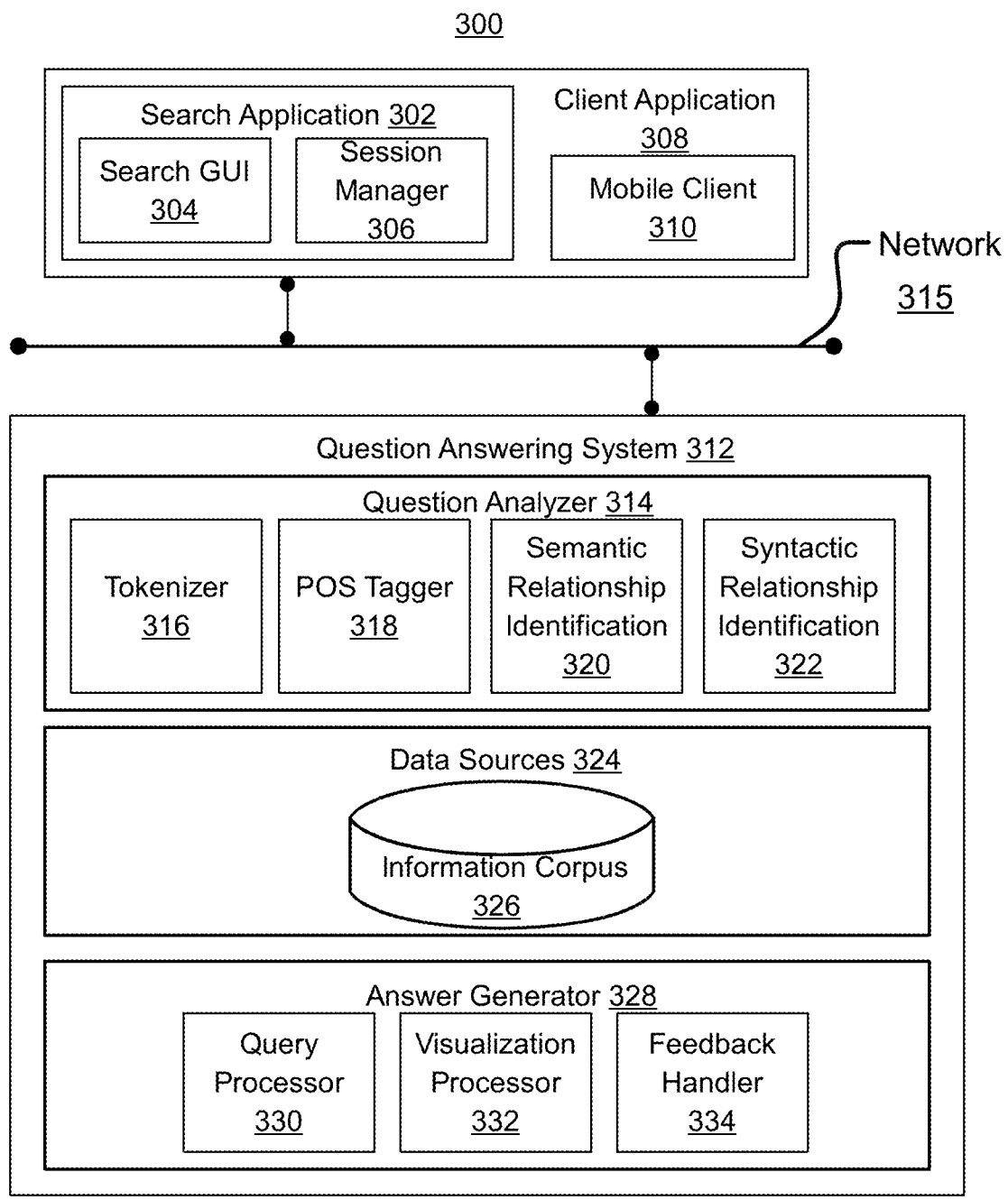
FIG. 3 is a block diagram illustrating a question answering system to generate answers to one or more input questions, according to embodiments.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to queries (e.g., input questions). In certain embodiments, one or more users may send requests for information to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a search application 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application installed on a mobile or other handheld device. In certain embodiments, mobile client 310 may dispatch query requests to QA system 312.

Consistent with various embodiments, search application 302 can dispatch requests for information to QA system 312. In certain embodiments, search application 302 can be a client application to QA system 312. In certain embodiments, search application 302 can send requests for answers to QA system 312. Search application 302 may be installed on a personal computer, a server or other computer system. In certain embodiments, search application 302 can include a search graphical user interface (GUI) 304 and session manager 306. Users may enter questions in search GUI 304. In certain embodiments, search GUI 304 may be a search box or other GUI component, the content of which represents a question to be submitted to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315, e.g. the Internet, intranet, or other public or private computer network. In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308, e.g., posed questions by users. QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may include, but are not limited to a tokenizer 316, part-of-speech (POS) tagger 318, semantic relationship identification 320, and syntactic relationship identification 322.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multi-word tokens, numbers, and punctuation marks. In certain embodiments, tokenizer 316 can receive a string of characters, identify the lexemes in the string, and categorize them into tokens.

Consistent with various embodiments, POS (part of speech) tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In certain embodiments, POS tagger 316 can tag or otherwise annotates tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized entities in questions posed by users. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 130 may trigger computer modules 132-144. Question analyzer 130 can use functionality provided by computer modules 316-322 individually or in combination. Additionally, in certain embodiments, question analyzer 130 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database (e.g., conform to an ontology). In some example embodiments, data sources 324 may include one or more document repositories.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332 and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to receive an input question having a set of query attributes. The question analyzer 314 could, in certain embodiments, be used to evaluate the quality of the input question by comparing the set of query attributes to a set of assessment criteria. Further, the question answering system 312 could, in certain embodiments, be used to perform a search of an information corpus 326 for data that may provide an answer to the input question. The answer generator 328 can be used assign a set of quality values to the set of query attributes, as well as use the assigned set of quality values and the set of query attributes to generate an icon that indicates a visual representation of the quality of the input question. Further, the visualization processor 332 can, in certain embodiments, be used to render the icon (e.g., a digital face icon) in a designated display area.

Figure 4:
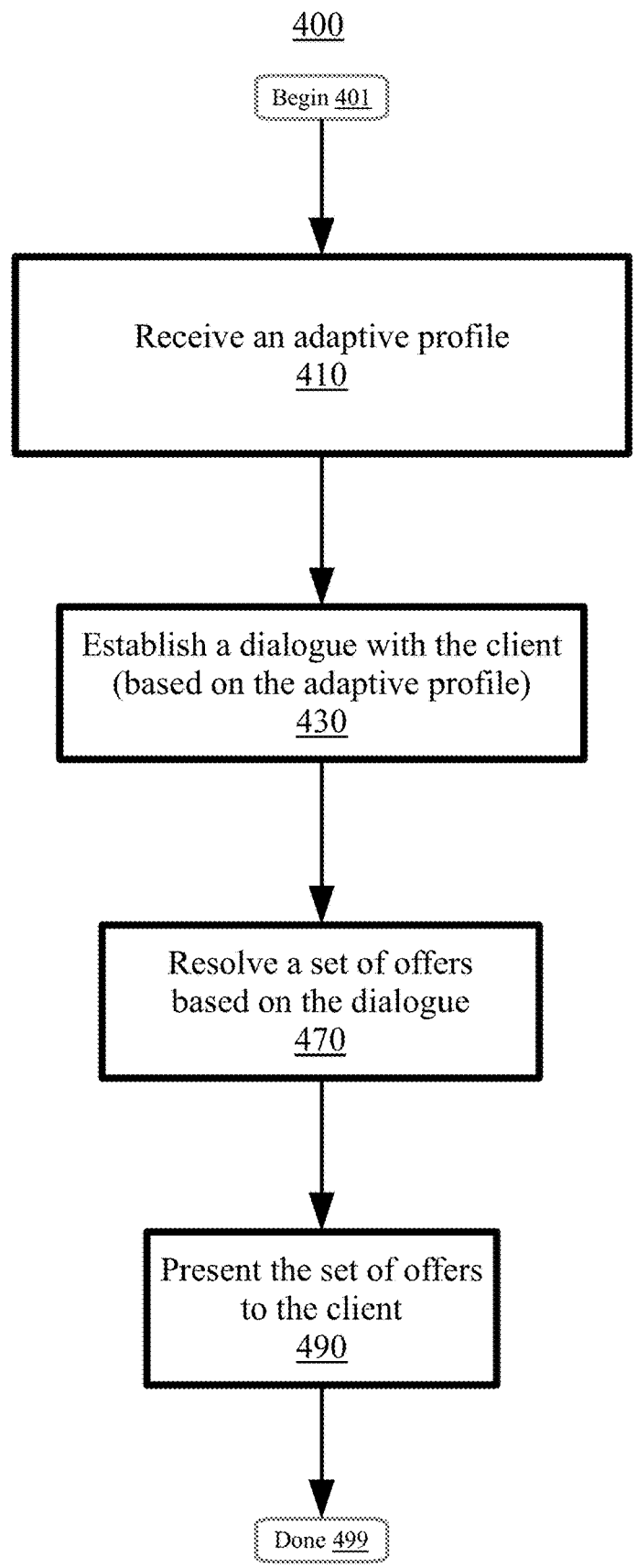
FIG. 4 is a flowchart illustrating a method for managing a set of offers using a dialogue, according to embodiments.

FIG. 4 is a flowchart illustrating a method 400 for managing a set of offers using a dialogue. Aspects of the method 400 relate to resolving and presenting a set of offers to a client based on a dialogue with the client. The client may include a customer, consumer, user buyer, shopper, patron, patient, subscriber, member, or other individual. Aspects of the disclosure relate to the recognition that, in some situations, maintaining a customer experience of uniform quality that is tailored to the individual needs of a client may be associated with challenges, as different agents/representatives have different backgrounds, experience, and levels of expertise. Accordingly, aspects of the disclosure relate to monitoring a dialogue with a client to collect data (e.g., profile data, event data, context data) for the client, and generating an adaptive profile that can be used to provide dialogue suggestions (e.g., questions, comments, responses) to facilitate effective client communication. The adaptive profile may be used to provide a set of offers (e.g., proposals, transactions, recommendations) relevant to the client based on the dialogue. Altogether, leveraging an adaptive profile with respect to a dialogue may be associated with benefits such as customer support, dialogue relevance, and client experience. The method 400 may begin at block 401.

At block 410, an adaptive profile may be received with respect to a client. Generally, receiving can include detecting, collecting, sensing, discovering, creating, recognizing, generating, obtaining, or otherwise accepting delivery of the adaptive profile. The adaptive profile may include a collection of information that characterizes the context, objective, sentiment, meaning, mood, or other properties of a dialogue (e.g., interaction). The adaptive profile may be dynamically updated based on the development and content of the dialogue to represent a real-time description of the current state of the dialogue as well as indicate suggested/recommended responses to progress the dialogue. In embodiments, the adaptive profile may indicate a set of client profile data. The set of client profile data may include information that characterizes the background, educational experience, interests, physical appearance, health, occupation, purchase history, or other information about a client. As an example, the set of client profile data may indicate that a client has a food sensitivity to peanuts. In embodiments, the adaptive profile may indicate a set of client event data. The set of client event data may include information that characterizes a transaction, activity, or action in which the client is engaged or otherwise involved. As an example, the set of client event data may indicate that the client is interacting with a sales representative at an automobile dealership. In embodiments, the adaptive profile may indicate a set of client context data. The set of client context data may include information that characterizes the external circumstances, situation, background or conditions in which the dialogue with the client takes place. As an example, the set of client context data may indicate that a blizzard is expected to occur at the location in which the client is located. In embodiments, receiving the adaptive profile may include collecting the set of client profile data, the set of client event data, and a set of client context data, and generating the adaptive profile based on the collected data. In embodiments, receiving the adaptive profile may include monitoring a dialogue with a client, and building the adaptive profile based on information captured from the dialogue with the client. Other methods of receiving the adaptive profile with respect to the client are also possible.

At block 430, a dialogue may be established with the client. The establishing may occur based on the adaptive profile. Generally, establishing can include initiating, beginning, determining, arranging, structuring, or otherwise instantiating the dialogue with the client. The dialogue may include an exchange of ideas or information between two or more individuals (e.g., a client/customer and a representative/agent). As examples, the dialogue may include a conversation between two or more individuals in the same physical location, a discussion between two or more individuals over a telephonic or computing interface, an interaction between an individual and a virtual entity (e.g., cognitive bot, information kiosk), a question-answering session, back-and-forth discourse, or the like. In embodiments, establishing the dialogue may include initiating an interaction with the client based on the adaptive profile. For instance, in certain embodiments, establishing the dialogue may include prompting an agent to initiate a conversation with a client (e.g., ask a client what they are looking for, instruct an agent to place a telephone call to a client) based on one or more elements of the adaptive profile (e.g., ask a question of the client based on the set of client profile data). In embodiments, establishing the dialogue may include responding to an interaction initiated by a client. As an example, establishing the dialogue may include configuring (e.g., programming, instructing) a virtual agent (e.g., cognitive bot, information kiosk) to provide a response to a client based on the adaptive profile (e.g., ask a contextually relevant question to the client based on the set of client event data). Consider the following example. The adaptive profile for a client may indicate that the client has a scheduled camping trip. Accordingly, in embodiments, establishing the dialogue may include prompting an agent (e.g., human or virtual) to ask the client whether he/she is looking for any camping gear in preparation for the scheduled camping trip. Other methods of establishing the dialogue with the client based on the adaptive profile are also possible.

At block 470, a set of offers may be resolved by an offer management engine. The set of offers may be resolved based on the dialogue. Generally, resolving can include computing, formulating, generating, calculating, selecting, identifying, or otherwise ascertaining the set of offers by the offer management system. The set of offers may include proposals, suggestions, propositions, endorsements, or recommendations that are selected for a client based on the dialogue. As examples, the set of offers may include product solicitations (e.g., energy-efficient refrigerator), service proposals (e.g., life insurance), subscription recommendations (e.g., monthly health supplements), action suggestions (e.g., to attend a seminar), membership invitations (e.g., to join a gym/fitness club), or proposals for a client. In embodiments, the set of offers may be resolved by an offer management engine based on the dialogue. The offer management engine may include a hardware component or software module configured to analyze the dialogue together with the adaptive profile associated with the dialogue to generate dialogue item suggestions (e.g., responses to be provided to the client) and the set of offers. In embodiments, resolving the set of offers may include examining the content of the dialogue (e.g., as indicated by the adaptive profile) using a predictive analysis technique to extract attributes regarding the needs, wants, intentions, interests, and purchase tendencies of the client, and comparing the extracted attributes to a prebuilt predictive model. The prebuilt predictive model may include an index, database, or other data structure configured to map the extracted attributes with associated offers. In embodiments, resolving the set of offers may include ascertaining one or more offers (e.g., indicated by the prebuilt predictive model) that are associated with a relevancy score above a relevancy threshold (e.g., indicated similarity or semantic correspondence with the attributes extracted from the dialogue). Consider the following example. The offer management engine may be configured to examine a dialogue between a client and a telecommunications provider, and ascertain that the client annually updates his/her cell phone to the newest model (e.g., he or she mentions "every year when I buy a new phone . . . "). Accordingly, an attribute of "annual phone upgrade" may be identified, and compared to the prebuilt predictive model. Based on the comparison, the prebuilt predictive model may indicate a set of offers of "Customer Loyalty Discount," "Annual Upgrade Package," and "Release Day Guarantee" for the client. Other methods of resolving the set of offers based on the dialogue are also possible.

At block 490, the set of offers may be presented to the client. Generally, presenting can include displaying, conveying, relaying, transmitting, communicating, indicating, or otherwise providing the set of offers to the client. Presenting may include providing the set of offers to the client using one or more of audio (e.g., voice recording), visual (e.g., images, presentation slides, video clip), or textual (e.g., email, file transmission, catalog) mediums. In embodiments, presenting the set of offers may include prompting an agent/representative to communicate the set of offers to the client. For instance, in the event that the dialogue is carried-out between a client and an agent using a telecommunications interface, the set of offers may be suggested to the agent, who may subsequently communicate the set of offers to the client. In embodiments, presenting may include directly providing the set of offers to the client. As an example, the set of offers may be transmitted to a device of the client (e.g., smart-phone, cell-phone, computer, television) and visually represented on a screen of the device of the client. In embodiments, presenting the set of offers may include performing a live demonstration for the client to illustrate the benefits, pros/cons of each offer of the set of offers. Consider the following example. With respect to the previous example in which a set of offers including "Customer Loyalty Discount," "Annual Upgrade Package," and "Release Day Guarantee" are resolved for a client, presenting the set of offers may include prompting an agent to explain each of the offers to the client (e.g., in person, over the phone, via a chat-system), as well as transmitting an informational email detailing the set of offers to an email address of the client. Other methods of presenting the set of offers to the client are also possible.

Consider the following example. A client may visit a bank and initiate a conversation with a bank agent. The dialogue between the client and the bank agent may be monitored to receive the adaptive profile by examining the semantic content of the dialogue. In embodiments, the adaptive profile may include a set of client event data that indicates that the client visited the bank in order to deposit a set of high-value checks, and that one of the checks is from an automobile company refunding the final payout amount after the lease of the client expired. The adaptive profile may also include a set of client profile data that indicates that the client has an interest in stock trading and brokering. Based on the dialogue between the client and the agent, the offer management engine may use a predictive analysis technique together with a prebuilt predictive model to resolve a set of offers for the client. For instance, the set of offers may include a proposal for brokerage services in which the client may receive 100 free trades if he transfers a certain currency amount into a brokerage account (e.g., based on the client's interest in stock trading and brokerage). As another example, the set of offers may include an offer for a new car lease through the bank (e.g., as the previous lease of the client has expired). Accordingly, the bank agent may be prompted to describe the set of offers to the client. Other methods of managing the set of offers using a dialogue are also possible.

Method 400 concludes at block 499. As described herein, aspects of method 400 relate to managing a set of offers using a dialogue. Aspects of method 400 may provide performance or efficiency benefits related to offer management. As an example, a dialogue with a client may be monitored to generate an adaptive profile that may be used to generate a set of context-relevant offers for a client. For instance, a client who recently became engaged to be married may be provided with offers for discounted airfares to popular honeymoon destinations. Aspects may save resources such as bandwidth, processing, or memory.

Figure 5:
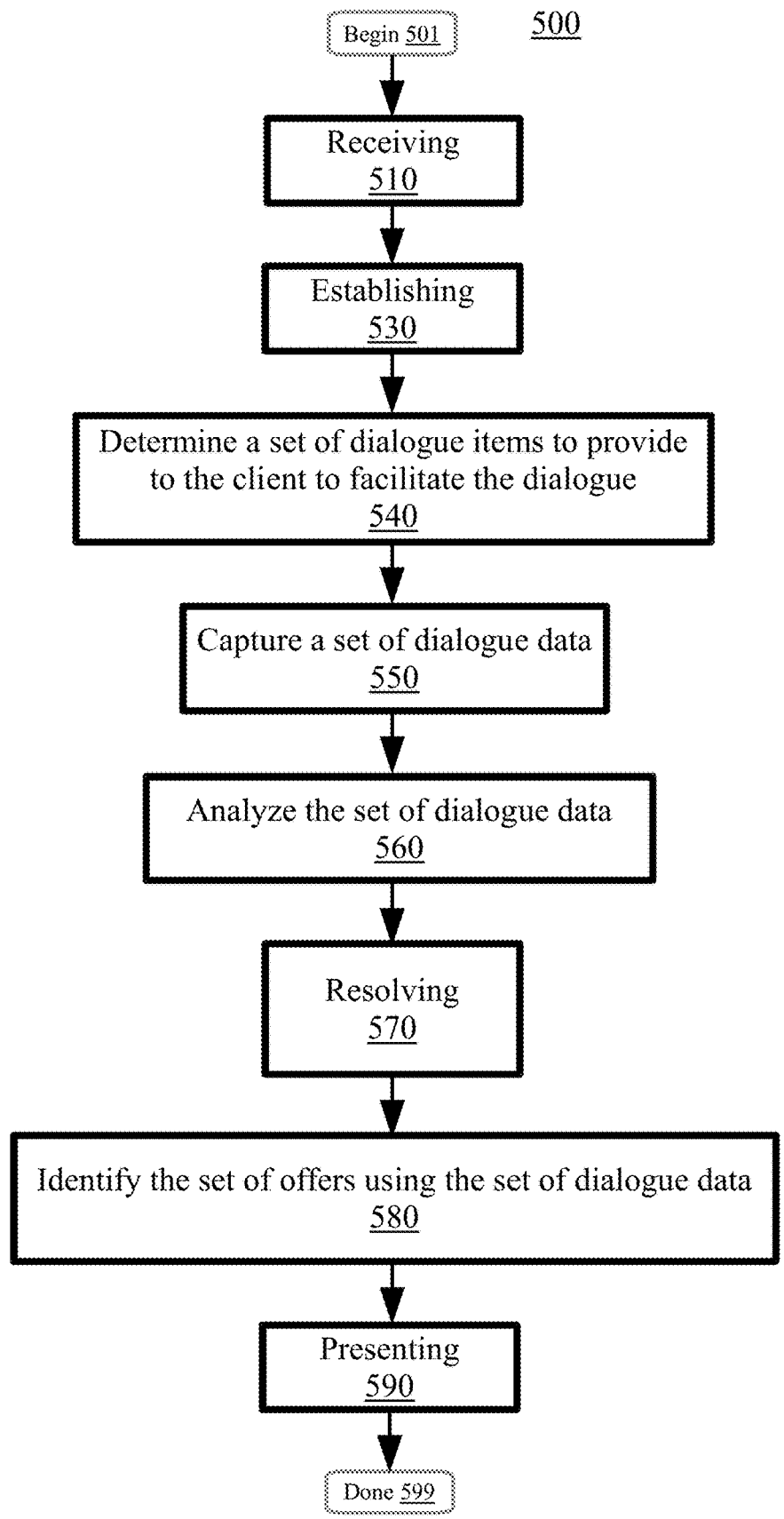
FIG. 5 is a flowchart illustrating a method for managing a set of offers using a dialogue, according to embodiments.

FIG. 5 is a flowchart illustrating a method 500 for managing a set of offers using a dialogue. Aspects of FIG. 5 relate to using a set of dialogue items to guide a dialogue with a client to facilitate identification of the set of offers. Aspects may be similar or the same as aspects of method 400, and aspects may be used interchangeably. The method 500 may begin at block 501. At block 510, an adaptive profile may be received. The receiving may occur with respect to a client. The adaptive profile may indicate a set of profile data. The adaptive profile may indicate a set of client event data. The adaptive profile may indicate a set of client context data. At block 530, a dialogue may be established with the client. The establishing may occur based on the adaptive profile.

At block 540, a set of dialogue items may be determined based on the adaptive profile. The set of dialogue items may be provided to the client to facilitate the dialogue. Generally, determining can include computing, formulating, generating, calculating, selecting, identifying, or otherwise ascertaining the set of dialogue items based on the adaptive profile. The set of dialogue items may include guided responses, statements, questions, prompts, topics of conversation, attitudes, circumstances, sentiments, events, or other suggested words, phrases, or communication styles to facilitate the dialogue with the client. For instance, the set of dialogue items may be used to prompt a client for additional information, refocus the client on a subject, query the client about a particular topic, ascertain the goal or intention of a client, or the like. In embodiments, the set of dialogue items may be determined based on the adaptive profile. Determining the set of dialogue items may include mapping one or more attributes of the set of client profile data, the set of client event data, or the set of client context data to a predictive dialogue tree that illustrates potential branches or channels in which the dialogue may develop, and selecting one or more dialogue items from the predictive dialogue tree that progress the dialogue in a desired direction. Consider the following example. A client may be engaged in a dialogue with a telecommunications service engineer about the features available using a newly upgraded cable television package. In embodiments, determining the set of dialogue items may include analyzing the adaptive profile for the dialogue with the client, and ascertaining that a set of client context data indicates that fiber-optic internet services have recently become available in the service area of the client. The set of client context data may be compared to the predictive dialogue tree, and a dialogue item of "Are you happy with your current internet service? New service options have become available in your area and I'd be happy to show them to you if you're interested" may be determined (e.g., to ascertain the client's interest in potentially upgrading to fiber-optic internet service). Other methods of determining the set of dialogue items based on the adaptive profile are also possible.

At block 550, a set of dialogue data may be captured. The set of dialogue data may be captured from the client with respect to the dialogue. Generally, capturing can include collecting, obtaining, acquiring, ingesting, recording, or otherwise receiving the set of dialogue data. The set of dialogue data may include information that characterizes the nature, attitude, goals, content, meaning, context, sentiment, and other properties of the dialogue with the client. As examples, the set of dialogue data may include the semantic and syntactic content of responses made by the client (e.g., in response to questions and statements by the agent), the intonation of the voice of the client, pause duration (e.g., time to respond), gestures, facial expressions, eye contact/movement, physical appearance, attitude, and the like. In embodiments, capturing the set of dialogue data may include using an audio capture system to record the dialogue and ingest the set of dialogue data indicated by the voice of the client. In embodiments, capturing the set of dialogue data may include utilizing a image/video capture system to collect photographs or videos of the dialogue with the client. In certain embodiments, one or more image analysis techniques such as 2D and 3D object recognition, image segmentation, motion detection, single particle tracking, video tracking, optical flow, and the like may be used to examine the captured photographs or videos and extract the set of dialogue data. As an example, capturing the set of dialogue data may include ingesting audio and video data for the dialogue with the client, and analyzing it to identify a set of dialogue data that indicates that a client is highly engaged in the conversation and has expressed interest in hearing about additional products or services from an agent. Other methods of capturing the set of dialogue data are also possible.

At block 560, the set of dialogue data may be analyzed by the offer management engine. Generally, analyzing can include evaluating the content of the set of dialogue data to determine one or more properties, attributes, or characteristics (e.g., engagement, interest, attitude) of the dialogue with the client. Analyzing can include examining (e.g., performing an inspection of the set of dialogue data), evaluating (e.g., generating an appraisal of the set of dialogue data), resolving (e.g., ascertaining an observation/conclusion/answer with respect to the set of dialogue data), parsing (e.g., deciphering structured and unstructured data constructs of the set of dialogue data), querying (e.g., asking a question regarding the set of dialogue data) or categorizing (e.g., organizing by a feature or element of the set of dialogue data). Data analysis may include a process of inspecting, cleaning, transforming, or modeling data to discover useful information, suggest conclusions, or support decisions. Data analysis can extract information/patterns from a data set and transform/translate it into an understandable structure for further use. As an example, analyzing may include utilizing one or more natural language processing techniques, image processing techniques, or sentiment analysis techniques to identify the nature, attitude, goals, content, meaning, context, sentiment, and other properties of the dialogue data. Other methods of analyzing the set of dialogue data to by the offer management engine are also possible.

At block 570, a set of offers may be resolved. The resolving may be performed by an offer management engine. The resolving may occur based on the dialogue.

At block 580, the set of offers may be identified. The identifying may be performed by the offer management engine. The set of offers may be identified using the set of dialogue data. Generally, identifying can include detecting, collecting, sensing, discovering, recognizing, distinguishing, ascertaining, or otherwise determining the set of offers. In embodiments, identifying the set of offers may include ascertaining a set of filtering criteria based on analyzing the set of dialogue data, and applying the set of filtering criteria to a list of available offers to filter the list down to those offers that are expected to be associated with a positive response from the client (e.g., as indicated by the set of dialogue data). The set of filtering criteria may include characteristics, conditions, requirements, stipulations, or other factors related to the client that indicate which types of offers are expected to be positively received by the client, and which types of offers the client is not expected to have an interest in. The set of filtering criteria may be ascertained based on an analysis of historical data for the client in conjunction with the set of dialogue data. As an example, the set of filtering criteria may indicate that a client has historically not participated in services that require a membership commitment. Accordingly, in embodiments, the filtering criteria may be applied to a list of available offers to remove those offers that necessitate a membership commitment, and the remaining offers may be identified as the set of offers. In embodiments, a plurality of filtering criteria may be applied to filter the list of available offers and identify the set of offers. Other methods of identifying the set of offers using the set of dialogue data are also possible.

At block 590, the set of offers may be presented to the client. Method 500 concludes at block 599. As described herein, aspects of method 500 relate to managing a set of offers using a dialogue. Aspects of method 500 may provide performance or efficiency benefits related to offer management. Aspects may save resources such as bandwidth, processing, or memory. Altogether, leveraging an adaptive profile with respect to a dialogue may be associated with benefits such as customer support, dialogue relevance, and client experience.

Figure 6:
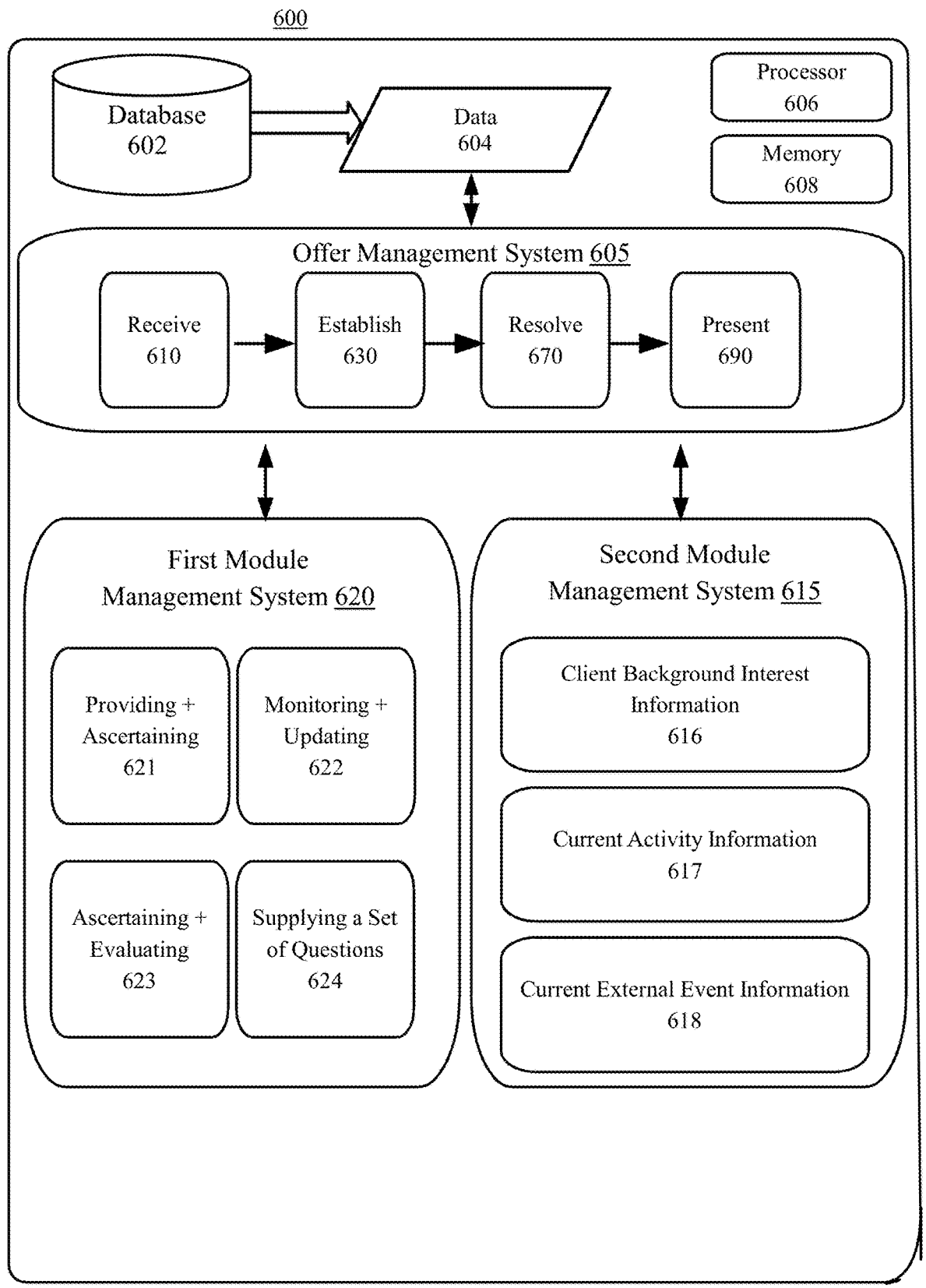
FIG. 6 depicts an example system for managing a set of offers using a dialogue, according to embodiments.

FIG. 6 depicts an example system 600 for managing a set of offers using a dialogue, according to embodiments. The example system 600 may include a processor 606 and a memory 608. The example system 600 may include a database 602 configured to maintain data used for offer management. In embodiments, the example system 600 may include an offer management system 605. The offer management system 605 may be communicatively connected to the database 602, and be configured to receive data 604 related to offer management. The offer management system 605 may include a receiving module 610 to receive an adaptive profile, an establishing module 630 to establish a dialogue with the client, a resolving module 670 to resolve a set of offers based on the dialogue, and a presenting module 690 to present the set of offers to the client. The offer management system 605 may be communicatively connected with a first module management system 620 which includes a set of modules for implementing aspects of offer management and a second module management system 615 which includes a set of modules for implementing aspects of offer management.

In embodiments, providing and ascertaining may occur at module 621. The set of dialogue items may be provided to the client to facilitate the dialogue. Generally, providing can include displaying, conveying, relaying, transmitting, communicating, indicating, or otherwise presenting the set of dialogue items to the client to facilitate the dialogue. In embodiments, providing may include communicating the set of dialogue items to the client. For instance, in certain embodiments, providing the set of dialogue items may include prompting a human agent interacting with the client to say the set of dialogue items to the client (e.g., the human agent may be prompted via a computer screen, headset). In embodiments, providing the set of dialogue items may include configuring a virtual agent (e.g., cognitive bot, kiosk) to display the dialogue items to the client via an image, text description, or video. Based on the set of dialogue items, the set of dialogue data may be ascertained. Generally, ascertaining can include computing, formulating, generating, calculating, selecting, identifying, or otherwise determining the set of dialogue data. In embodiments, ascertaining the set of dialogue data may include receiving an answer, response, or reaction from a client in response to one or more dialogue items, and identifying the client response as the set of dialogue data. As an example, in response to presenting a dialogue item of "We are currently offering interest rates as low as 1.4% for qualified buyers; would you be interested in hearing about our financing plans?" a response from a client of "Wow, that's significantly cheaper than what I've seen elsewhere! What can you tell me about your fixed rate plans?" may be ascertained as the set of dialogue data. Other methods of providing the set of dialogue items and ascertaining the set of dialogue data are also possible.

In embodiments, monitoring and updating may occur at module 622. The dialogue may be monitored to capture the set of dialogue data. Generally, monitoring can include scanning, observing, supervising, overseeing, listening, auditing, or otherwise tracking the dialogue. In embodiments, monitoring the dialogue may include recording the dialogue using a microphone, video camera, or other audio capture module. In embodiments, monitoring the dialogue may include using a text-to-speech translation module to convert the spoken content of the dialogue to text. As described herein, the recorded dialogue may be analyzed to capture (e.g., derive, determine) the set of dialogue data for the dialogue with the client. As an example, consider a situation in which a client is interacting with an informational kiosk. The informational kiosk may present a query to the client (e.g., text displayed on a screen, a voice prompt) asking "What product or service are you looking for today?" Accordingly, in response to presentation of the query, the informational kiosk may initiate a recording module to monitor the response of the client and capture a set of dialogue data of "I'm looking for a new dishwasher". The adaptive profile may be updated with respect to the client. The updating may occur in a dynamic fashion based on the set of dialogue data. Generally, updating can include renewing, refreshing, amending, adjusting, revising, or otherwise modifying the adaptive profile in a dynamic fashion. In embodiments, updating the adaptive profile may include summarizing the set of dialogue data, selecting a portion of the set of dialogue data, forming a deduction based on the set of dialogue data, or performing another action to process the set of dialogue data and subsequently append the processed set of dialogue data to the adaptive profile in real-time (e.g., on-the-fly, in an ongoing fashion). Other methods of monitoring the dialogue to capture the set of dialogue data and updating the adaptive profile in a dynamic fashion based on the set of dialogue data are also possible.

In embodiments, ascertaining and evaluating may occur at module 623. A set of derived inference data may be ascertained using a natural language processing technique with respect to the set of dialogue data. Generally, ascertaining can include identifying, detecting, formulating, deriving, or otherwise determining the set of derived inference data using the natural language processing technique with respect to the set of dialogue data. The natural language processing technique may include one or more computer-based algorithms configured to derive meaning from natural language content. As examples, the natural language processing technique may include algorithms configured for part-of-speech tagging, parsing, relationship extraction, sentiment analysis, information retrieval, information extraction, morphological segmentation, and the like. As described herein, the natural language processing technique may be used to ascertain a set of derived inference data. The set of derived inference data may include a collection of deductions, conclusions, interpretations, suppositions, or other elements determined based on the analysis of the set of dialogue data. In embodiments, ascertaining the set of derived influence data may include performing the natural language processing technique to extract one or more attributes corresponding to either the set of client profile data, the set of client event data, or the set of client context data, and adding the extracted attribute to the adaptive profile. As an example, semantic and syntactic content of a set of dialogue data of "I'm in the mood for tacos" may be analyzed using a natural language processing technique, and an attribute of "Food Preference: Tacos" may be identified as the set of derived inference data (e.g., and used to dynamically update the adaptive profile of the client). In embodiments, aspects of the disclosure relate to assigning a confidence score to indicate the probability that the extracted attribute is accurate (e.g., the confidence score may be revised over time as additional data is collected for the adaptive profile). In embodiments, a set of candidate offers may be evaluated. The evaluating may occur to identify the set of offers. The set of candidate offers may be evaluated with respect to both the set of derived inference data and the adaptive profile. Generally, evaluating can include assessing, examining, scoring, investigating, analyzing, or otherwise appraising the set of candidate offers with respect to both the set of derived inference data and the adaptive profile. The set of candidate offers may include a list of potential offers from which the set of offers for presentation to the client may be identified. In embodiments, evaluating the set of candidate offers may include examining the set of candidate offers with respect to the set of derived inference data and the adaptive profile, and assigning a relevance score to one or more of the set of candidate offers based on the similarity, significance, pertinence, salience, or germaneness of that particular candidate offer with respect to the set of derived inference data and the adaptive profile.

Consider the following example. A set of dialogue data with a client may indicate that the client is looking for restaurants in his or her vicinity. Accordingly, a set of candidate offers may include restaurants that are within a threshold distance (e.g., 3 miles, 5 miles, 10 miles) from the current location of the client. For instance, the set of candidate offers may include "Mario's Classic Deep-Dish Pizza," "Hearthfire Bar and Grill," "Wild Bill's Super Spicy Tacos," "Grandma's Kitchen," and "El Torero's Tacos." As described herein, the set of candidate offers may be evaluated based on a set of derived inference data as well as the adaptive profile for the client. In embodiments, the set of derived inference data may indicate that the client has a food preference for tacos, and the set of client profile data of the adaptive profile may indicate that the client has a food intolerance for tomato, and has a dislike for spicy food. Accordingly, based on the comparison with the set of derived inference data and the adaptive profile, a score may be assigned to evaluate each of the set of candidate offers. For instance, a score of 11 may be assigned to "Mario's Classic Deep-Dish Pizza" (e.g., based on the client's food intolerance for tomato, a common ingredient in pizza sauce), a score of "54" may be assigned to "Hearthfire Bar and Grill," a score of 25 may be assigned to "Wild Bill's Super Spicy Tacos," (e.g., based on the client's dislike of spicy foods), a score of 61 may be assigned to "Grandma's Kitchen," and a score of "84" may be assigned to "El Torero's Tacos," (e.g., based on the preference of the client for tacos). In certain embodiments, a subset of the set of candidate offers that achieve a score threshold (e.g., score of 50) may be identified as the set of offers and presented to the client. As such, in certain embodiments, "Hearthfire Bar and Grill," "Grandma's Kitchen," and "El Torero's Tacos," may be identified as the set of offers for presentation to the client. Other methods of ascertaining the set of derived inference data and evaluating a set of candidate offers to identify the set of offers are also possible.

In embodiments, a set of questions may be supplied at module 624. The set of dialogue items may be supplied using an analytics engine. The set of dialogue items may include a set of questions with respect to a set of subject matters. Generally, supplying can include displaying, conveying, relaying, transmitting, communicating, indicating, suggesting or otherwise providing the set of questions using the analytics engine. The set of questions may include a collection of inquiries or queries to prompt an answer or response from the client. In embodiments, the set of questions may be formulated by the analytics engine based on the adaptive profile for the client. The set of questions may relate to a set of subject matters (e.g., topics, themes). As an example, a set of questions with respect to a subject matter of "Insurance" may include "Are you happy with your current insurance provider?" "What types of insurance services do you currently make use of?" and "Do you understand the scope of your current insurance coverage?" The analytics engine may include a hardware component or software module configured to analyze the adaptive profile and generate the set of questions (e.g., using a dialogue tree). In embodiments, supplying the set of questions may include providing the set of questions to an agent or representative to facilitate dialogue with a client. As an example, in certain embodiments, the set of questions may be transmitted to a tablet device (e.g., voice headset, computer monitor, smartphone, and other types of devices are also possible) of the agent as suggests to pose to a client. Other methods of supplying the set of questions are also possible In embodiments, client background interest information may be managed at module 616. It may be detected that the set of client profile data includes a set of client background interest information. Generally, detecting can include sensing, discovering, collecting, recognizing, distinguishing, generating, obtaining, ascertaining, or otherwise determining the client background interest information. The client background interest information may include data that indicates areas of interest of the client. As examples, the client background interest information may indicate favorite sports/sports teams, hobbies, food preferences, music genres/artists, or other areas of interest for a particular client. In embodiments, detecting the set of client profile data may include analyzing a set of purchases made by the client within a threshold time period (e.g., the spending patterns of the client may indicate his or her interests). In embodiments, the set of dialogue items may be determined based on the set of client background interest information. Generally, determining can include computing, formulating, generating, calculating, selecting, identifying, or otherwise ascertaining the set of dialogue items based on the set of client background interest information. In embodiments, determining the set of dialogue items based on the set of client background interest information may include formulating a set of guided responses, statements, questions, sentiments, topics of conversation, or other prompts using a concept map to identify concepts that are associated with the set of client background interest information. As an example, for a client having a set of client background interest information indicating an interest in "off-road biking," the concept map may be used to identify a set of dialogue items of "What type of bike do you use?" "How frequently do you go off-road biking?" and "What type of terrain do you typically ride in?"

In embodiments, the set of dialogue items may be provided to the client to facilitate the dialogue. The set of dialogue items may relate to the set of client background interest information. Generally, providing the set of dialogue items may include displaying, conveying, relaying, transmitting, communicating, indicating, or otherwise presenting the set of dialogue items to the client to facilitate the dialogue. In embodiments, providing the set of dialogue items may include prompting an agent or representative to deliver the set of dialogue items to the client. In embodiments, providing the set of dialogue items may include configuring a program, cognitive bot, kiosk, or other computing module to transmit, display, or present the set of dialogue items to the client. In embodiments, the set of dialogue data may be ascertained based on the set of dialogue items which relates to the set of client background interest information. The set of dialogue data may indicate a set of relevant feedback to the set of dialogue items which relates to the set of client background interest information. Generally, ascertaining can include computing, formulating, generating, calculating, selecting, identifying, or otherwise determining the set of dialogue data which may indicate the set of relevant feedback. The set of relevant feedback may include data or information that indicates an answer, comment, assessment, evaluation, reaction, observation, or other response with respect to the set of dialogue items. The set of relevant feedback may correspond to the same subject matter as the set of dialogue items. In embodiments, ascertaining the set of dialogue data which indicates the set of relevant feedback information may include capturing the set of dialogue data (e.g., recording the dialogue) and subsequently analyzing the set of dialogue data to determine the set of relevant feedback information. As an example, in response to a set of dialogue items of "What type of terrain do you typically ride in?" a set of dialogue data of "I normally ride in desert terrain and other sandy environments." Other methods of managing the client background interest information are also possible.

In embodiments, current activity information may be managed at module 617. It may be detected that the set of client event data includes a set of current activity information. Generally, detecting can include sensing, discovering, collecting, recognizing, distinguishing, generating, obtaining, ascertaining, or otherwise determining the current activity information. The set of current activity information may include data that indicates an action, event, task, operation, transaction, or other activity in which the client is engaged. In embodiments, the set of current activity information may include a reason or motivation for why the client is engaging in a particular activity. As examples, the set of current activity information may indicate that the client is engaged in a retail transaction, ordering a meal at a restaurant, in a waiting room at a clinic, waiting in line at a bank, or the like. In embodiments, the set of dialogue items may be determined based on the set of current activity information. Generally, determining can include computing, formulating, generating, calculating, selecting, identifying, or otherwise ascertaining the set of dialogue items based on the set of current activity information. In embodiments, determining the set of dialogue items based on the set of client activity information may include formulating a set of guided responses, statements, questions, sentiments, topics of conversation, or other prompts to clarify, support, facilitate, assist, or add context to the activity of the client. As an example, for a client having a set of client activity information indicating that a client is at the check-out counter of a retail store to purchase a pair of running shoes, a set of dialogue items including questions of "How often do you go running?" and "Have you ever run a marathon or half-marathon?" may be determined to facilitate the dialogue.

In embodiments, the set of dialogue items may be proved to the client to facilitate the dialogue. The set of dialogue items may relate to the set of current activity information. Generally, providing the set of dialogue items may include displaying, conveying, relaying, transmitting, communicating, indicating, or otherwise presenting the set of dialogue items to the client to facilitate the dialogue. In embodiments, providing the set of dialogue items may include prompting an agent or representative to deliver the set of dialogue items to the client. In embodiments, providing the set of dialogue items may include configuring a program, cognitive bot, kiosk, or other computing module to transmit, display, or present the set of dialogue items to the client. In embodiments, the set of dialogue data may be ascertained. The ascertaining may occur based on the set of dialogue items which relates to the set of current activity information. The set of dialogue data may indicate a set of relevant feedback to the set of dialogue items which relates to the set of current activity information. Generally, ascertaining can include computing, formulating, generating, calculating, selecting, identifying, or otherwise determining the set of dialogue data which may indicate the set of relevant feedback. The set of relevant feedback may include data or information that indicates an answer, comment, assessment, evaluation, reaction, observation, or other response with respect to the set of dialogue items. In embodiments, ascertaining the set of dialogue data which indicates the set of relevant feedback information may include capturing the set of dialogue data (e.g., recording the dialogue) and subsequently analyzing the set of dialogue data to determine the set of relevant feedback information. As an example, in response to a set of dialogue items of "Have you ever run a marathon or half-marathon?" a set of dialogue data of "No, but I'll be running in my first half-marathon next month. Any tips?" may be ascertained. Other methods of managing the client activity information are also possible.

In embodiments, current external event information may be managed at module 618. It may be detected that the set of client profile data includes a set of current external event information. Generally, detecting can include sensing, discovering, collecting, recognizing, distinguishing, generating, obtaining, ascertaining, or otherwise determining the current external event information. The set of current external event information may include data that indicates local events, weather conditions, situations, external circumstances, background information, or other conditions that contextualize the dialogue with the client. As an example, the set of current external event information may indicate that the current date is within a threshold number of days from a holiday or event (e.g., Halloween, Valentine's Day). In embodiments, the set of dialogue items may be determined based on the set of current external event information. Generally, determining can include computing, formulating, generating, calculating, selecting, identifying, or otherwise ascertaining the set of dialogue items based on the set of current external event information. In embodiments, determining the set of dialogue items based on the set of current external event information may include formulating a set of guided responses, statements, questions, sentiments, topics of conversation, or other prompts that relate to the upcoming holiday, event or context indicated by the set of current external event information. As an example, for a set of current external event information indicating that it is less than 7 days until Halloween, a set of dialogue items including questions such as "Have your children decided what they'd like to go as for Halloween next week?" or "Have you purchased candy to pass out for Halloween next week?" may be determined to facilitate the dialogue.

In embodiments, the set of dialogue items may be provided to the client to facilitate the dialogue. The set of dialogue items may relate to the set of current external event information. Generally, providing the set of dialogue items may include displaying, conveying, relaying, transmitting, communicating, indicating, or otherwise presenting the set of dialogue items to the client to facilitate the dialogue. In embodiments, providing the set of dialogue items may include prompting an agent or representative to deliver the set of dialogue items to the client. In embodiments, providing the set of dialogue items may include configuring a program, cognitive bot, kiosk, or other computing module to transmit, display, or present the set of dialogue items to the client. In embodiments, the set of dialogue data may be ascertained based on the set of dialogue items which relates to the set of current external event. The set of dialogue data may indicate a set of relevant feedback to the set of dialogue items which relates to the set of current external event information. Generally, ascertaining can include computing, formulating, generating, calculating, selecting, identifying, or otherwise determining the set of dialogue data which may indicate the set of relevant feedback. The set of relevant feedback may include data or information that indicates an answer, comment, assessment, evaluation, reaction, observation, or other response with respect to the set of dialogue items. In embodiments, ascertaining the set of dialogue data which indicates the set of relevant feedback information may include capturing the set of dialogue data (e.g., recording the dialogue) and subsequently analyzing the set of dialogue data to determine the set of relevant feedback information. As an example, in response to a set of dialogue items of "Have your children decided what they'd like to go as for Halloween next week?" a set of dialogue data of "My oldest has his pirate costume all figured out, but my youngest hasn't found a princess costume she likes yet. Do you have anything like that in stock?" may be ascertained. Other methods of managing the client activity information are also possible.

Figure 7:
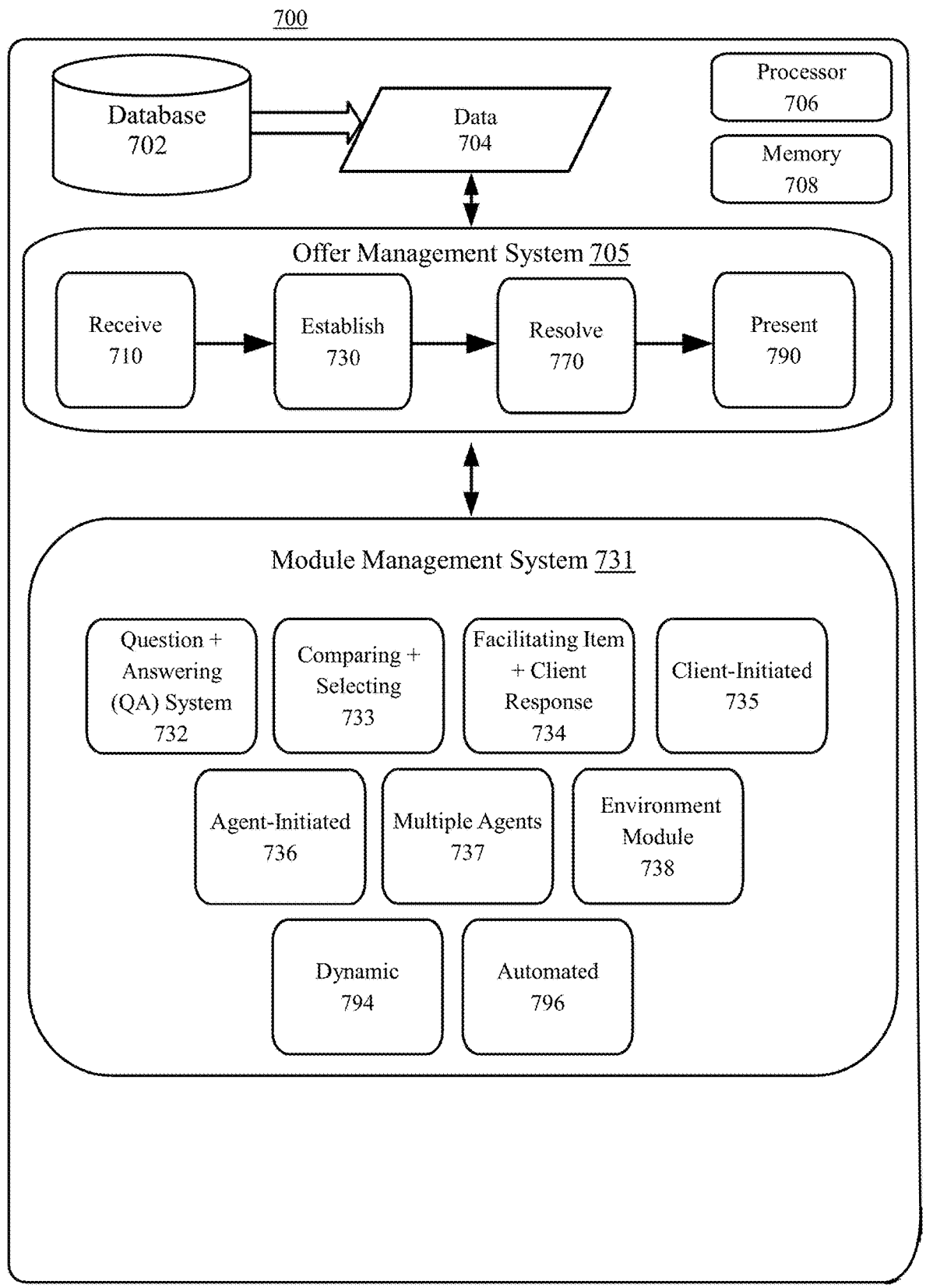
FIG. 7 depicts an example system for managing a set of offers using a dialogue, according to embodiments.

FIG. 7 depicts an example system 700 for managing a set of offers using a dialogue, according to embodiments. The example system 700 may include a processor 706 and a memory 708. The example system 700 may include a database 702 configured to maintain data used for offer management. In embodiments, the example system 700 may include an offer management system 705. The offer management system 705 may be communicatively connected to the database 702, and be configured to receive data 704 related to offer management. The offer management system 705 may include a receiving module 710 to receive an adaptive profile, an establishing module 730 to establish a dialogue with the client, a resolving module 770 to resolve a set of offers based on the dialogue, and a presenting module 790 to present the set of offers to the client. The offer management system 705 may be communicatively connected with a module management system 731 which includes a set of modules for implementing aspects of offer management.

In embodiments, a Question and Answering (QA) system may be invoked at module 732. The QA system may be invoked to establish the dialogue with the client based on the adaptive profile. Generally, invoking can include instantiating, calling, activity, utilizing, or otherwise implementing the QA system to establish the dialogue with the client based on the adaptive profile. The QA system may include a hardware component, software model, or combination of computer hardware and software configured to resolve questions posed by users in a natural language. The QA system may construct its answers by querying a structured database of knowledge or information (e.g., knowledge base, corpus). In embodiments, the QA system may be configured to pull answers from an unstructured collection of natural language documents. The QA system may be configured to resolve closed-domain questions (e.g., questions that fall under a specific domain, such as architecture, real-estate) or open-domain questions (e.g., questions that are wide-ranging in nature and relate to general ontologies). In embodiments, invoking the QA system may include configuring a QA pipeline such that a dialogue and adaptive profile for a client is captured an transmitted to the QA system for analysis. The QA system may evaluate the dialogue and generate the set of dialogue items to facilitate the dialogue with the client. In embodiments, the QA system may formulate the set of offers for presentation to the client. Other methods of invoking the QA system to establish the dialogue with the client based on the adaptive profile are also possible.

In embodiments, comparing and selecting may occur at module 733. The adaptive profile may be compared with a corpus of candidate dialogue items. The comparing may be performed by the QA system. Generally, comparing can include contrasting, analyzing, juxtaposing, correlating, or evaluating the adaptive profile with the corpus of candidate dialogue items. The corpus of candidate dialogue items may include a database, index, repository, or other collection of dialogue items stored in an organized and structured fashion. In embodiments, comparing may include examining the adaptive profile with respect to the corpus of candidate dialogue items to ascertain the relevance of one or more candidate dialogue items with respect to the adaptive profile. As an example, in embodiments, comparing may include searching the corpus of candidate dialogue items for those dialogue items that share a subject matter tag or a keyword tag with the adaptive profile (e.g., a subject matter tag of "suggested yarn types for beginning knitters"). A set of dialogue items for the dialogue with the client may be selected based on the comparing. Generally, selecting can include choosing, picking, deciding, nominating, or otherwise electing the set of dialogue items for the dialogue with the client. In embodiments, selecting may include ascertaining a match between one or more of the dialogue items of the corpus of candidate dialogue items and the adaptive profile, and choosing the dialogue items associated with the match as the set of dialogue items. In embodiments, selecting may include determining that one or more of the dialogue items of the corpus of candidate dialogue items achieve a relevancy threshold with respect to the adaptive profile. As an example, a candidate dialogue item of "What sort of furniture items are you looking for today?" may be determined to achieve a relevancy threshold with respect an adaptive profile for a client that is browsing the furniture section of a home-improvement store. Other methods of comparing the adaptive profile with the corpus of candidate dialogue items and selecting the set of dialogue items for the dialogue with the client are also possible.

In embodiments, a facilitating item and client response may be managed at module 734. A plurality of individual respective contents of the adaptive profile may be mapped with a plurality of individual respective candidate dialogue items of the corpus of candidate dialogue items. Generally, mapping can include matching, corresponding, correlating, joining, or otherwise associating the plurality of individual respective contents of the adaptive profile with the plurality of individual respective candidate dialogue items of the corpus of candidate dialogue items. The plurality of individual respect contents of the adaptive profile may include portions, characteristics, attributes, segments, or other properties of the adaptive profile. The plurality of individual respective candidate dialogue items may include one or more particular dialogue items stored in the corpus of candidate dialogue items. In embodiments, mapping the plurality of individual respective contents of the adaptive profile with the plurality of individual respective candidate dialogue items may include linking those contents of the adaptive profile with those candidate dialogue items that share a subject matter tag, a keyword tag, or achieve a similarity threshold. For instance, a plurality of individual respective contents of the adaptive profile relating to "Parents of a new-born child" may be mapped with candidate dialogue items of "Do you have enough diapers?" and "Are you looking for baby clothing or formula?" In embodiments, a facilitating item may be presented (e.g., displayed, conveyed, relayed, transmitted, communicated, indicated, provided) to the client to trigger a client response. The facilitating item may include a prompt configured to elicit a response from a client. As examples, the facilitating item may include a question, a still image, a video clip, an audio clip, or the like. The client response may include a facial expression, gesture, body language, verbal response, input, or other reaction from the client (e.g., indirect or direct, subtle or obvious, nuanced or straightforward). In embodiments, presenting the facilitating item may include displaying the facilitating item on a screen, verbally communicating the facilitating item to the client, or otherwise indicating the facilitating item to the client.

In embodiments, the client response may be detected (e.g., sensed, discovered, collected, recognized, distinguished, generated, obtained, ascertained, determined). In embodiments, detecting the client response may include utilizing a camera or a microphone to capture audio or video data of the client, and deriving the client response from an analyze of the captured audio or video data. In embodiments, the client response may be detected using an input device (e.g., keyboard, mouse, touch screen). In embodiments, the plurality of individual respective candidate dialogue items may be evaluated (e.g., assessed, examined, scored, investigated, analyzed, appraised) based on the client response. In embodiments, evaluating the plurality of individual respective candidate dialogue items may include assessing the relevance of each of the plurality of individual respective candidate dialogue items with respect to the client response (e.g., based on keywords, semantic content, subject matter), and assigning a relevance score (e.g., quantitative indication of the pertinence, saliency, or germaneness) to each of the individual respective candidate dialogue items. A single dialogue item may be selected (e.g., chosen, picked, decided, nominated, elected) based on the evaluating. In embodiments, the single dialogue item may be selected to provide to the client to facilitate the dialogue. In embodiments, selecting the single dialogue item may include ascertaining an individual respective candidate dialogue item with a relevance score above a threshold (e.g., the highest score, a relevance score over 85), and electing it as the single dialogue item. Other methods of managing a facilitating item and a client response are also possible.

In embodiments, client-initiation may occur at module 735. An interaction may be detected to be client-initiated. Generally, detecting can include sensing, discovering, collecting, recognizing, distinguishing, generating, obtaining, ascertaining, or otherwise determining that the interaction is client-initiated. The client-initiated interaction may include a transaction that is begun or commenced by the client. In embodiments, detecting that the interaction is client initiated may include ascertaining that the client began communication with an agent (e.g., human representative, kiosk, or cognitive bot). As an example, it may be detected that a client approached an informational kiosk and submitted a query regarding the location and inventory selection of a particular store within a shopping mall environment. In embodiments, a client-initiated type of dialogue may be established with the client. The establishing may occur in response to detecting that the interaction is client-initiated. Generally, establishing can include initiating, beginning, determining, arranging, structuring, or otherwise instantiating the client-initiated type of dialogue with the client. The client-initiated type of dialogue may include a communication style, strategy, or dialogue content that is configured for clients who have initiated an interaction (e.g., and may be interested in information regarding a particular product or service). In embodiments, establishing the client-initiated type of dialogue may include providing an agent with a script for answer the questions of the client. In embodiments, establishing the client-initiated type of dialogue may include beginning a dialogue with the client that fails to achieve a directness threshold (e.g., indirect manner of speaking, subtle/nuanced dialogue, soft sell strategy). In embodiments, establishing the client-initiated type of dialogue may include beginning a dialogue with a client that achieves a time length threshold (e.g., dialogue that takes a comparatively longer time to complete). Other methods of detecting that the initiation is client initiated and establishing the client-initiated type of dialogue are also possible.

In embodiments, agent-initiation may occur at module 736. An interaction may be detected to be agent-initiated. Generally, detecting can include sensing, discovering, collecting, recognizing, distinguishing, generating, obtaining, ascertaining, or otherwise determining that the interaction is agent-initiated. The agent-initiated interaction may include a transaction that is begun or commenced by an agent (e.g., representative of an organization, group, or service). In embodiments, detecting that the interaction is agent initiated may include ascertaining that the agent began communication with the client. As an example, it may be detected that an agent approached/called out to a customer to inform them of a promotion, product, or service. In embodiments, an agent-initiated type of dialogue may be established with the client. The establishing may occur in response to detecting that the interaction is agent-initiated. Generally, establishing can include initiating, beginning, determining, arranging, structuring, or otherwise instantiating the agent-initiated type of dialogue with the client. The agent-initiated type of dialogue may include a communication style, strategy, or dialogue content that is configured for clients who were initially contacted by an agent (e.g., and may not be aware of a particular product or service, may be averse to being approached). For instance, in embodiments, establishing the agent-initiated type of dialogue may include beginning a dialogue with the client that achieves a directness threshold (e.g., direct manner of speaking, straightforward, dialogue, hard sell strategy). In embodiments, establishing the agent-initiated type of dialogue may include beginning a dialogue with a client that achieves a brevity threshold (e.g., dialogue that takes a substantially short time to complete). Other methods of detecting that the initiation is agent initiated and establishing the agent-initiated type of dialogue are also possible.

In embodiments, multiple agents may engage in the dialogue with the client at module 737. In embodiments, aspects of the disclosure relate to the recognition that, in some situations, the dialogue with the client may be carried-out by one or more agents (e.g., at the same time, or one-by-one in a staggered fashion). The dialogue with the client may be initiated by a first agent. Generally, initiating can include initiating, beginning, opening, starting, or otherwise instantiating the dialogue with the client by the first agent. As described herein, the first agent may include a human representative of an organization, a virtual assistant, kiosk, cognitive bot, or the like. In embodiments, initiating the dialogue with the client may include prompting the first agent to call out to or approach the client and begin the dialogue, and continuing the dialogue until a temporary conclusion point (e.g., point at which the dialogue ends). In embodiments, the dialogue with the client may be sustained by a second agent. Generally, sustaining can include advancing, continuing, keeping-up, or otherwise maintaining the dialogue by the second agent. In embodiments, the second agent may be separate or different from the first entity (e.g., physically separate kiosks, different individuals). In embodiments, sustaining the dialogue may include resuming the dialogue from the temporary conclusion point (e.g., picking up where the dialogue between the client and the first agent left off). In embodiments, aspects of the disclosure relate to maintaining the adapted profile for the client throughout the dialogue with both the first agent and the second agent (e.g., the client may have several discussions on different topics with multiple agents that are all part of the same dialogue). As an example, a client that enters a retail store may begin a conversation with a first agent at which point the adapted profile for the client is received, and the same adapted profile may be carried-over for a conversation with a second agent of the retail store. Other methods of multiple agents engaging in the dialogue with the client are also possible.

In embodiments, the set of offers may be managed in a contextual environment at module 738. The contextual environment may include a financial environment (e.g., banking, insurance). The contextual environment may include a retail environment (e.g., shopping mall, grocery store). The contextual environment may include a health-wellness environment (e.g., gym, fitness club, clinic, hospital, rehabilitation center, elder care facility). The contextual environment may include a telecommunication/media environment (e.g., via the telephone, Internet, television, radio). The contextual environment may include a government environment (e.g., city hall, embassy, courthouse). The contextual environment may include a public safety environment (e.g., police department, fire department). The contextual environment may include an education environment (e.g., kindergarten, elementary school, middle school, high school, college, university). The contextual environment may include a transportation environment (e.g., car, bus, taxi, train, airplane). The contextual environment may include an information technology environment (e.g., the Internet, cloud computing environment, distributed computing environment). The contextual environment may include a tourism environment (e.g., touristic attraction, tour bus). Other types of contextual environments are also possible.

In embodiments, the receiving, the establishing, the resolving, the presenting, and the other steps described herein may each be executed in a dynamic fashion at module 794. The steps described herein may be executed in a dynamic fashion to streamline management of the set of offers using the dialogue. For instance, the receiving, the establishing, the resolving, the presenting, and the other steps described herein may occur in real-time, ongoing, or on-the-fly. As an example, one or more steps described herein may be performed in real-time (e.g., the adaptive profile for the dialogue may be dynamically updated as the dialogue progresses) in order to streamline (e.g., facilitate, promote, enhance) management of the set of offers using the dialogue. Other methods of performing the steps described herein are also possible.

In embodiments, the receiving, the establishing, the resolving, the presenting, and the other steps described herein may each be executed in an automated fashion at module 796. The steps described herein may be executed in an automated fashion without user intervention. In embodiments, the receiving, the establishing, the resolving, the presenting, and the other steps described herein may be carried out by an internal dialogue management module maintained in a persistent storage device of a local computing device (e.g., network node). In embodiments, the receiving, the establishing, the resolving, the presenting, and the other steps described herein may be carried out by an external dialogue management module hosted by a remote computing device or server (e.g., server accessible via a subscription, usage-based, or other service model). In this way, aspects of offer management using a dialogue may be performed using automated computing machinery without manual action. Other methods of performing the steps described herein are also possible.

Consider the following example. A client may visit a clinic for a doctor's appointment. An adaptive profile for the client may maintain a set of client profile data indicating the medical history, past diagnoses, vitals, tests, treatments, genotypic information, and phenotypic information for the client. The adaptive profile may maintain a set of client context data that indicates medical literature, treatment reports, and medical studies that may be relevant to the condition of the client. The adaptive profile may maintain a set of client event data that indicates that the client appears upset or agitated (e.g., based on video data captured for the client using a camera in the clinic). Based on the adaptive profile, a nurse (e.g., agent) may initiate a dialogue with the client. For instance, the nurse may greet the client by saying, "Good morning, Mr. Johnson! How are you today?" to which the client may respond by saying "Pretty lousy, actually. My wife just called to say our daughter needs to be picked up early from school, and I still haven't gotten in to work because I'm sitting here waiting for my blood to be drawn. My boss won't like it if I'm late AND have to leave early in the afternoon!" In embodiments, the dialogue between the client and the nurse may be monitored, and, based on the adaptive profile and the response of the client, the nurse may be guided (e.g., using a headset or earpiece to relay dialogue items) in the dialogue to facilitate communication with the client. In certain embodiments, the nurse may be prompted to propose a set of offers to the client. For example, the nurse may say, "Wow, it sounds like you have quite a busy schedule today! In order to help you out, I could have you fill out your paperwork for this visit next time you come in, in order to save some time. Also, in the future, did you know that you can have blood drawn at your local pharmacy? That might be closer to your home." In embodiments, the client may respond by saying "Wow, really? If I could do my paperwork next time that would really help me out!" Other methods of managing the set of offers are also possible.

Figure 8:
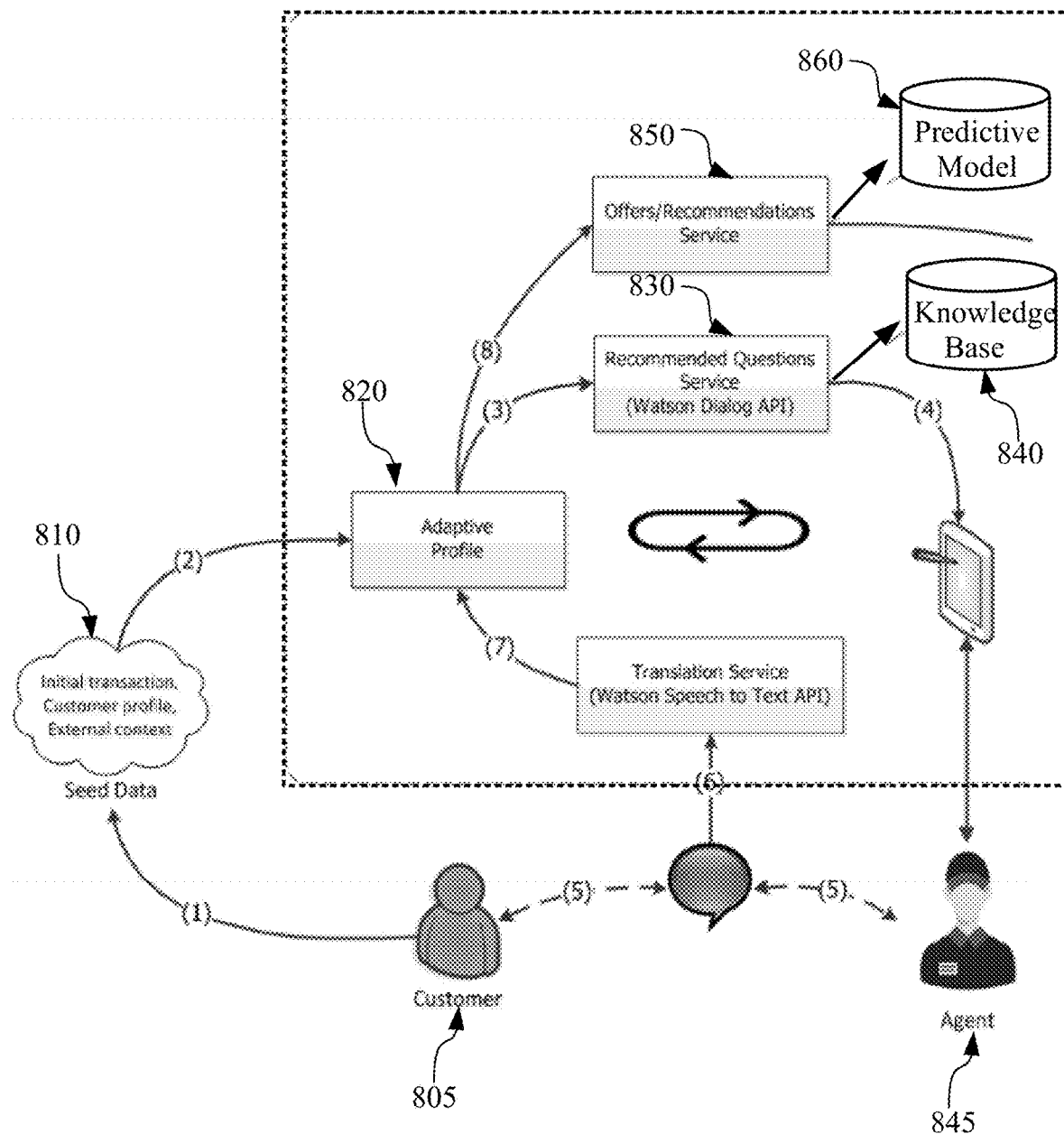
FIG. 8 depicts an example system architecture for managing a set of offers using a dialogue, according to embodiments.

FIG. 8 depicts an example system architecture 800 for managing a set of offers using a dialogue, according to embodiments. Aspects of FIG. 8 relate to resolving and presenting a set of offers to a client 805 based on an adaptive profile 820 generated based on a dialogue with the client 805. In embodiments, a set of seed data (e.g., information regarding an initial transaction, client profile, or external context) 810 may be collected based on a dialogue with a client 805 (e.g., customer). Based on the set of seed data 810, an adaptive profile 820 may be generated and transmitted to a QA system 830 for analysis. The QA system 830 may make use of a knowledge base 840 to determine a set of recommended questions (e.g., set of dialogue items). The set of recommended questions may be transmitted to an agent 845 interfacing with the client 805, who may use the recommended questions to facilitate the dialogue with the client 805 and ascertain additional information about the motivations, needs, interests, goals, wants, and intentions of the client 805. In embodiments, the dialogue with the client 805 may be monitored and translated from speech to text. Information from the dialogue may be used to dynamically update and revise the adaptive profile 820 for the dialogue with the client 805 in real-time. In embodiments, the revised adaptive profile 820 may be examined by an offers/recommendations service 850 that uses a predictive model 860 to formulate a set of offers for the client 805. In embodiments, the set of offers may be presented to the client 805. Other methods of managing the set of offers are also possible.

Consider the following example. A client may visit a jewelry store and begin looking at jewelry. An adaptive profile having a set of client profile data, a set of client event data, and a set of client context data may be received for the client. The set of client profile data may indicate that the client falls within an age group between 25 and 35 years of age. The set of client event data may indicate that the client appears to be comparing diamond rings of different diamond cuts. The set of client context data may indicate that the current date is within a threshold time period from Valentine's Day (e.g., 10 days away from Valentine's Day). In embodiments, an agent of the jewelry store may initiate a dialogue with the client, and ask "Hello, are you looking for a gift for someone for Valentine's Day?" The client may respond by stating "Yes, I'm looking for an engagement ring, and my budget is $5000. I like the look of the marquise cut, but is it possible to get a 2 carat marquise cut diamond with a high degree of symmetry within my price range?" As described herein, the dialogue with the client may be monitored and translated to text. The text may be analyzed by a natural language processing technique to extract one or more attributes from the dialogue and update the adaptive profile. For instance, attributes of "Budget: $5000" and "Diamond Preferences: High Symmetry, 2 carats" may be extracted and used to update the adaptive profile. Based on the updated adaptive profile, a set of dialogue items may be provided to the agent to facilitate the dialogue with the client. As an example, the agent may use a dialogue item of "Unfortunately a 2 carat diamond may be out of your price range, but a 1.5 carat marquise cut with high symmetry is definitely possible. Also, oval diamonds have less symmetry concerns but have a similar shape. Would you be interesting in seeing our selection?" to carry-on the dialogue with the client. In embodiments, the client may respond affirmatively, indicating a desire to see additional engagement rings. Based on the affirmative reaction of the client, a set of offers may be generated based on the adaptive profile and the response of the client, and the set of offers may be presented to the client. As an example, a set of offers including a 1.5 carat marquise cut with moderate symmetry, a 1.0 carat marquise cut with high symmetry, a 1.5 carat oval cut with high symmetry, and a 2 carat oval with high symmetry may be generated and presented to the client. Other methods of managing the set of offers are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for managing a set of offers using a dialogue, the method comprising:

receiving, with respect to a client, an adaptive profile which indicates:
   a set of client profile data,
   a set of client event data, and
   a set of client context data;

establishing, based on the adaptive profile, the dialogue with the client;

detecting that the set of client profile data includes a set of client background interest information, a set of current activity information, and a set of current external event information, determining, based on the set of client background interest information, the set of current activity information, and the set of current external event information, a set of dialogue items to provide to the client to facilitate the dialogue;

providing, to the client to facilitate the dialogue, the set of dialogue items which relate to the set of client background interest information, the set of current activity information, and the set of current external event information;

capturing, from the client with respect to the dialogue, a set of dialogue data, the set of dialogue data comprises the semantic and syntactic content of the client's responses to questions and statements by the agent, the intonation of the client's voice, a duration the client's respond time, the client's gestures, the client's facial expressions, the client's eye movement, the client's physical appearance, and the client's attitude;

ascertaining, using a natural language processing technique with respect to the set of dialogue data, a set of derived inference data; and evaluating, to identify the set of offers, a set of candidate offers with respect to both the set of derived inference data and the adaptive profile;

identifying, by the offer management engine, the set of offers from the set of candidate offers using the set of dialogue data;

resolving, by an offer management engine, the set of offers based on the dialogue; and presenting, to the client, the set of offers.

2. The method of claim 1,
wherein the set of client background interest information comprises data that indicates areas of interest of the client,
wherein the set of current activity information comprises data that indicates an action, event, task, operation, transaction, or other activity in which the client is engaged, and
wherein the set of current external event information comprises data that indicates local events, weather conditions, situations, external circumstances, background information, or other conditions that contextualize the dialogue with the client.

3. The method of claim 1, further comprising:
wherein the set of client profile data comprises information that characterizes the background, educational experience, interests, physical appearance, health, occupation, and purchase history about the client,
wherein the set of client event data comprises information that characterizes a transaction, activity, or action in which the client is engaged or otherwise involved, and
wherein the set of client context data comprises information that characterizes the external circumstances, situation, background or conditions in which the dialogue with the client takes place.

4. The method of claim 1, further comprising:
monitoring the dialogue to capture the set of dialogue data; and
updating, in a dynamic fashion based on the set of dialogue data, the adaptive profile with respect to the client.

5. The method of claim 1, further comprising:
supplying, using an analytics engine, the set of dialogue items including a set of questions with respect to a set of subject matter.

6. The method of claim 1, further comprising:
ascertaining, based on the set of dialogue items which relates to the set of client background interest information, the set of dialogue data which indicates a set of relevant feedback to the set of dialogue items which relates to the set of client background interest information.

7. The method of claim 1, further comprising:
ascertaining, based on the set of dialogue items which relates to the set of current activity information, the set of dialogue data which indicates a set of relevant feedback to the set of dialogue items which relates to the set of current activity information.

8. The method of claim 1, further comprising:
ascertaining, based on the set of dialogue items which relates to the set of current external event information, the set of dialogue data which indicates a set of relevant feedback to the set of dialogue items which relates to the set of current external event information.

9. The method of claim 1, further comprising:
invoking, to establish the dialogue with the client based on the adaptive profile, a Question and Answering (QA) system.

10. The method of claim 9, further comprising:
comparing, by the QA system, the adaptive profile with a corpus of candidate dialogue items; and
selecting, based on the comparing, a set of dialogue items for the dialogue with the client.

11. The method of claim 10, further comprising:
mapping a plurality of individual respective contents of the adaptive profile with a plurality of individual respective candidate dialogue items of the corpus of candidate dialogue items;
presenting, to the client, a facilitating item to trigger a client response;
detecting the client response;
evaluating, based on the client response, the plurality of individual respective candidate dialogue items; and
selecting, based on the evaluating, a single dialogue item to provide to the client to facilitate the dialogue.

12. The method of claim 1, further comprising:
detecting that an interaction is client-initiated; and
establishing, in response to detecting that the interaction is client-initiated, a client-initiated type of dialogue with the client.

13. The method of claim 1, further comprising:
detecting that an interaction is agent-initiated; and
establishing, in response to detecting that the interaction is agent-initiated, an agent-initiated type of dialogue with the client.

14. The method of claim 1, further comprising:
initiating, by a first agent, the dialogue with the client; and
sustaining, by a second agent, the dialogue with the client while maintaining the adapted profile for the client throughout the dialogue with both the first agent and the second agent.

15. The method of claim 1, further comprising:
managing the set of offers using the dialogue in a contextual environment selected from the group consisting of:
a financial environment,
a retail environment,
a health-wellness environment,
a telecommunication/media environment,
a government environment,
a public safety environment,
an education environment,
a transportation environment,
an information technology environment, and
a tourism environment.

16. The method of claim 1, further comprising:
executing, in a dynamic fashion to streamline management of the set of offers using the dialogue, each of:
the receiving, the establishing, the resolving, and the presenting.

17. The method of claim 1, further comprising:
executing, in an automated fashion without user intervention, each of:
the receiving, the establishing, the resolving, and the presenting.

* * * * *